United States Patent Office 3,410,983
Patented Nov. 12, 1968

3,410,983
METHOD AND APPARATUS FOR RESISTANCE WELDING AND TESTING
Karl Deutsch, Am Dorpweiher 60, Wuppertal-Elberfeld, Germany, and Gunter Wilkens, Asternstr. 16, Hannover, Germany
Continuation-in-part of application Ser. No. 253,364, Jan. 23, 1963. This application June 8, 1965, Ser. No. 462,283
Claims priority, application Germany, May 23, 1962, D 38,984
18 Claims. (Cl. 219—109)

ABSTRACT OF THE DISCLOSURE

A resistance welder includes electrodes with coolant spaces having ultrasonic transducers therein for welding and testing. The welds are tested by transmitting first ultrasonic pulses through the welding zone while the workpieces are clamped but before flow of current, and by transmitting second ultrasonic pulses through the welding zone after welding and while the workpieces are still clamped. A comparison circuit includes signal storage means for the first pulses and an evaluator whereby the first and second pulses can be compared to evaluate the welding quality.

---

This invention relates to the non-destructive testing of electric resistance spot, seam, and other types of pressure welds, and, in particular, to a novel method of and apparatus for non-destructive ultrasonic testing of spot, seam and other pressure welds formed by electric resistance welding. This application is a continuation-in-part of our copending application Ser. No. 253,364 and now abandoned, filed Jan. 23, 1963, for "Method and Apparatus for Testing Welds."

Spot welds and other forms of pressure welds, involving electric resistance welding, have been used for years for weld-uniting metallic structural parts. However, where the welds are used in highly stressed constructions where they are subject predominately to dynamic stresses, such as in aircraft and other vehicle constructions, the high standards with respect to the quality of the welds between structural parts present a serious problem from the standpoint of economical quality control.

Such welds may be tested either destructively or non-destructively. In the destructive testing of welds a cut is made through the weld, transversely thereof, so that a cross section of the weld may be examined and so that the test piece may be subjected to various stresses, such as bending, tension, and the like to observe the behavior of the weld. Such destructive testing, however, is undesirable from the standpoint of a production operation as it involves re-making welds. Furthermore, there is no assurance that succeeding welds will be identical, in every respect, with the particular weld which has been destructively tested.

Non-destructive testing may be performed in various manners. Such testing must give information on the occurrence, as well as the extent, of mechanical faults such as pores, cracks and other defects. In addition, it must provide data about the actual bond between the work pieces.

One method of non-destructive testing of welds is to use an X-ray testing technique, or, more generally, a radiographic technique. Such a technique furnishes reliable information about the most important defects in pressure welds, but the X-ray picture is rarely able to indicate insufficient bonding between the work pieces. Additionally, the cost of testing is considerable as compared with the cost of forming the weld, and the use of a radiographic testing method alone is not justified for economic reasons, the more so since it does not provide for utilizing the test result for correction of the welding procedure for a work piece being treated. This is due to the fact that radiographic weld examination can be carried out only outside the welding machine and on a completely welded work piece. A further disadvantage of radiographic inspection methods is the danger of damage due to radiation.

With the development of supersonic testing methods for non-destructive testing of materials, there has been no lack of attempts to apply supersonic techniques to the testing of electronic resistance welded pressure welds. However, it is not possible to test completed welds outside the welding machine by means of the supersonic method because there is no reference basis with which the test results can be compared.

For this latter reason, attempts have been made to avoid this disadvantage by subjecting the work piece at the welded joint to supersonic energy both before welding and during passage of the welding current. Thus, it has been proposed to secure or cement ultrasonic vibrators onto the welding electrodes. In these known methods, all that can be determined is whether the level of the received ultrasonic energy either decreases or remains constant during flow of the welding current. Consquently, the results have been based upon the incorrect assumption that a reduction of the level of the received ultrasonic energy, during flow of the welding current, is the criterion of satisfactory welding.

In reality, however, known ultrasonic testing methods determine only whether or not the material has fused at the welding zone during passage of the welding current. Whether or not such fusion has provided a satisfactory welded joint cannot, however, be determined with known methods, for it can be shown that cracks and pores in the zone of fusion effect a reduction of the level of the received ultrasonic energy during formation of the weld, although to a much greater extent as compared with the material welded. Moreover, in the sonic and ultrasonic methods used in the known testing methods, interferences occur even when using frequency modulations and these interferences make it impossible to obtain a definite evaluation of the amplitude of the received ultrasonic energy. Additionally, in the known methods, the measured result is highly dependent on the welding voltage, temperature fluctuations of the ultrasonic vibrators and changes in the coupling conditions.

As is known to those skilled in the art, in the formation of a pressure-type joint such as a spot weld, using electric resistance welding, the parts to be weld united are subjected to pressure both before initiation of the welding current flow, during the welding current flow, and for a certain time following the interruption of the welding current flow. This latter time period, after the flow of welding current has been terminated, is sometimes referred to as the "after-pressure" time. It is the time while the work piece is still in the welding machine and maintained under pressure but when the welding current flow has been terminated. During this "after-pressure" time, gaps appear between the electrodes and the surfaces of the work pieces due to shrinkage of the work piece as a result of cooling of the latter. These gaps do not exist while the welding current is flowing.

The application of ultrasonic energy at the welding zone during the "pre-pressure" time, when the work piece is already clamped in the welding machine but the current flow has not been initiated, and the application of ultrasonic energy during the time the current is flowing, demonstrates that a comparison of the level of the received ultrasonic energy during these two time periods does not provide a valid criterion for evaluating the welding joint because the mentioned gaps, which appear during the "after-pressure" time, cannot be taken into consideration. The invention is based upon the recognition that it is essential to consider these gaps between the electrodes and the work pieces in order to evaluate the quality of the welded joint.

An object of the present invention is to provide a method for ultrasonic testing of pressure welds and which permits not only a satisfactory determination of the existence of a defect, but also a recognition of the type of defect.

Another object of the invention is to provide an apparatus for ultrasonic testing of welds and which provides not only a satisfactory determination of the existence of a defect, but also an indication of the type of defect.

A further object of the invention is to provide a method and apparatus for ultrasonic testing of welds which provide not only a satisfactory determination of the existence of a defect but also a recognition of the type of defect, and providing for adjustment of the welding operation in accordance with a preselected functional relationship.

Yet another object of the invention is to provide apparatus for ultrasonically testing welds and including means for adjusting the welding apparatus, either automatically or by hand, in accordance with a preselected functional relationship with the test values.

A further object of the invention is to provide a method of and apparatus for ultrasonic testing of welds and in which the measured results are substantially independent of the effects of welding voltage, temperature fluctuations and changes in coupling conditions.

Still another object of the invention is to provide a method of ultrasonic testing of pressure welds such as spot welds, involving the application of a series of first pulses of ultrasonic energy to the parts while clamped in position but before welding, and involving the application of a series of second pulses of ultrasonic energy to the parts after they have been welded but while they are still clamped in position, and measuring the quotient of the two received ultrasonic signals.

A further object of the invention is to provide apparatus for ultrasonically testing pressure welds, such as spot welds, and including means for applying a series of first pulses of ultrasonic energy to the work pieces while clamped in position prior to passage of the welding current, means to apply a series of second pulses of ultrasonic energy to the work pieces after termination of the welding current flow but while the work pieces are still clamped in position during a cooling period, and means to determine the quotient of the respective received ultrasonic signals.

The invention is based upon the discovery that a mere qualitative determination of the variation of the ultrasonic energy in ultrasonic testing of pressure welds, such as spot welds, cannot provide information either on the quality of the weld or on the type of defect therein. It has further been discovered that only a quantitative determination of the variations in the level of the received ultrasonic energy is effective for determining the quality of the weld and the type of defect.

Thus, in the method of the invention, ultrasonic energy is transmitted through the clamped work pieces before the flow of welding current therethrough, as during the mechanical clamping or "pre-pressure" time preceding the welding, and ultrasonic energy is transmitted through the clamped work pieces after formation of the weld and termination of the welding current flow and within the cooling period of the weld or "after-pressure" time while the work pieces are still clamper in position. The transmission and reception of ultrasonic energy is effected by ultrasonic vibrators installed in the coolant passages of the electrodes, and the ultrasonic energy is transmitted as pulses. Thereby, it is possible to determine, by measurements, the quotient of the received sound levels respectively relating to the first transmitted pulses of ultrasonic energy and the second transmitted pulses of ultrasonic energy. This quotient is the criterion of the quality of the weld and can moreover be evaluated to determine the type of defect. This evaluation can then be used to prevent further defective welds, if necessary, by providing for adjustment of the welding apparatus.

The invention apparatus comprises a spot welding machine having ultrasonic sound transducers positioned in coolant passages of the electrodes. The sound transmitting transducer is connected with a generator which, at periodic time intervals, generates short high frequency voltage pulses. The sound receiving transducer, whose size is not greater than and preferably is smaller than the fused zone, is connected, through an amplifier and a rectifier, with a monitor. The monitor is connected to an information storage unit which, in turn, is connected to the amplifier through a control system which regulates the sensitivity of the amplifier in such a manner that the voltage available at the storage unit, during the "pre-pressure" time, corresponds to a preselected value.

A control unit is provided and switches the monitor with a rhythm corresponding to the pulse rhythm of the generator, but shifted by the pulse transit time. This control unit connects the monitor with an evaluating device upon the transmission of the sound pulses immediately after termination of the welding current flow. The evaluation device determines the voltage difference between the monitor and the storage unit, and may have additional components for identifying the magnitude and direction of its signal indications. Means may also be provided to regulate the welding apparatus or spot welding machine to adjust the latter in accordance with any measured defects in the weld.

For an understanding of the principles of the invention, reference is made to the following description of a typical embodiment thereof as illustrated in the accompanying drawings.

Figure 1:
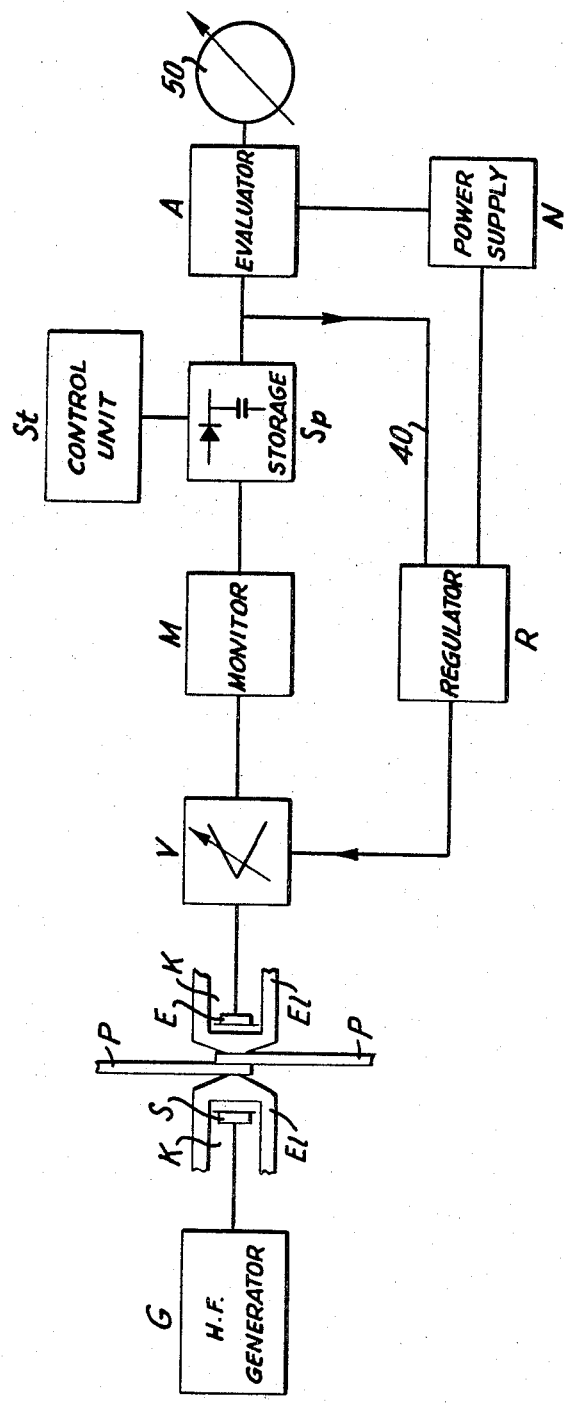
FIG. 1 is a block diagram of welding apparatus, including ultrasonic weld inspection means, embodying the invention.

Referring to FIG. 1, a high frequency generator G generates high frequency voltage pulses, of short duration, at preselected time intervals. Generator G is connected with an ultrasonic sound transducer S acting as a sound transmitter, and arranged in one electrode EL of a welding machine. Sound transmitter S is preferably positioned in cooling fluid in a coolant cavity K of electrode EL.

The work pieces P, P are positioned intermediate sound transmitter S and a sound receiver E which is also an ultrasonic sound transducer and is positioned in the other electrode EL within the coolant in the coolant cavity K of the latter. Sound receiver E is connected with the input of an amplifier V which amplifies and rectifies the output voltage or signal of sound receiver E in a ratio which is adjustable by means of a setting member. The output of amplifier V is connected to a monitor device M, which is an electronic switch which provides for a voltage present at its input to pass through its output only when auxiliary voltage is applied to the monitor M.

The output of monitor M is connected to a storage means S$p$ which stores the DC voltage, briefly applied to its input, for prolonged time. Storage means or device S$p$ may utilize a rectifier and a charging condenser for storage of the input signal. Device S$p$ is connected with an input of amplifier V through a regulating system or set R, such as a servo system. This regulating system R regulates the sensitivity of amplifier V in a manner such that the voltage available at the input of storage device S$p$ corresponds to a preselected value, or to a nominal or rated voltage.

An evaluating unit A is connected to the output of storage device S$p$ and indicates the difference between the output voltage of the monitor M after the welding has been completed and the voltage of storage means S$p$, which is the nominal or rated voltage thereof. Unit A provides an indication or a signal indicating whether or not the measured difference is within or is outside of presettable limiting values. A control unit S$t$ controls the timing of all functions and a power supply N supplies all of the units.

The operation of the apparatus shown in FIG. 1 will now be described. Generator G generates high frequency voltage pulses, of short duration, at certain times $t_1$ separated by time interval $t_0$. Each pulse is supplied to sound transmitter S which transforms the applied high voltage pulse, through the piezo-electric effect, into a high frequency sound pulse. The high frequency sound pulses are transmitted through the coupling medium which, in this case, is a coolant, the bottom of electrode EL, through the work pieces P to be welded, which are clamped under an initial pressure between the electrodes EL, through the counter-electrode EL and its coolant, to the sound receiver E. The ultrasonic pulses arrive at receiver E at a time $t_2$ and sound receiver E transforms the received ultrasonic pulses, through the piezo-electric effect, into electric voltages proportional to the received ultrasonic pulses.

The amplifier V amplifies the output voltage of transducer E and rectifies the same. The amplified and rectified voltage is then supplied to storage unit S$p$ through monitor M. Monitor M is switched in by control unit or timer S$t$ after the interval $t_0$, but at a time shifted, with relation to the transmitting time $t_1$, by the transit time $t_3 = t_2 - t_1$.

Regulating unit R adjusts the amplifier sensitivity until the voltage supplied to storage unit S$p$ corresponds to a preselected value. As soon as this regulation step is completed, the control S$t$ initiates the flow of welding current. After a preselected interval, the welding current flow is interrupted under the control of the control unit S$t$. After interruption of the welding current flow and during cooling of the work pieces in the so-called "after-pressure" time, during which the work pieces remain clamped under pressure, the weld is again subjected to ultrasonic energy by a pulse supplied from generator G. At this time, control S$t$ connects monitor M with evaluating means A, so that the voltage at the output of monitor M is now supplied to evaluating device A. Device A indicates the difference between this latter voltage and the assigned voltage value at the storage means S$p$, and furnishes signals or indications identifying certain defects and corresponding to the magnitude and direction of the defects.

Summarizing the operation briefly, a series of ultrasonic pulses are applied to the work pieces while the latter are clamped together under pressure and before the welding current flows therethrough, and a voltage corresponding to the received ultrasonic energy is stored. After the welding current has been interrupted, and while the work pieces are still clamped together under pressure during the cooling period, a second series of ultrasonic pulses are applied to the weld and a voltage corresponding to the received or transmitted ultrasonic energy is derived. This second voltage is then compared with the first voltage and the difference therebetween is utilized as a measure of any defects and the type of defects in the completed weld.

Figure 2:
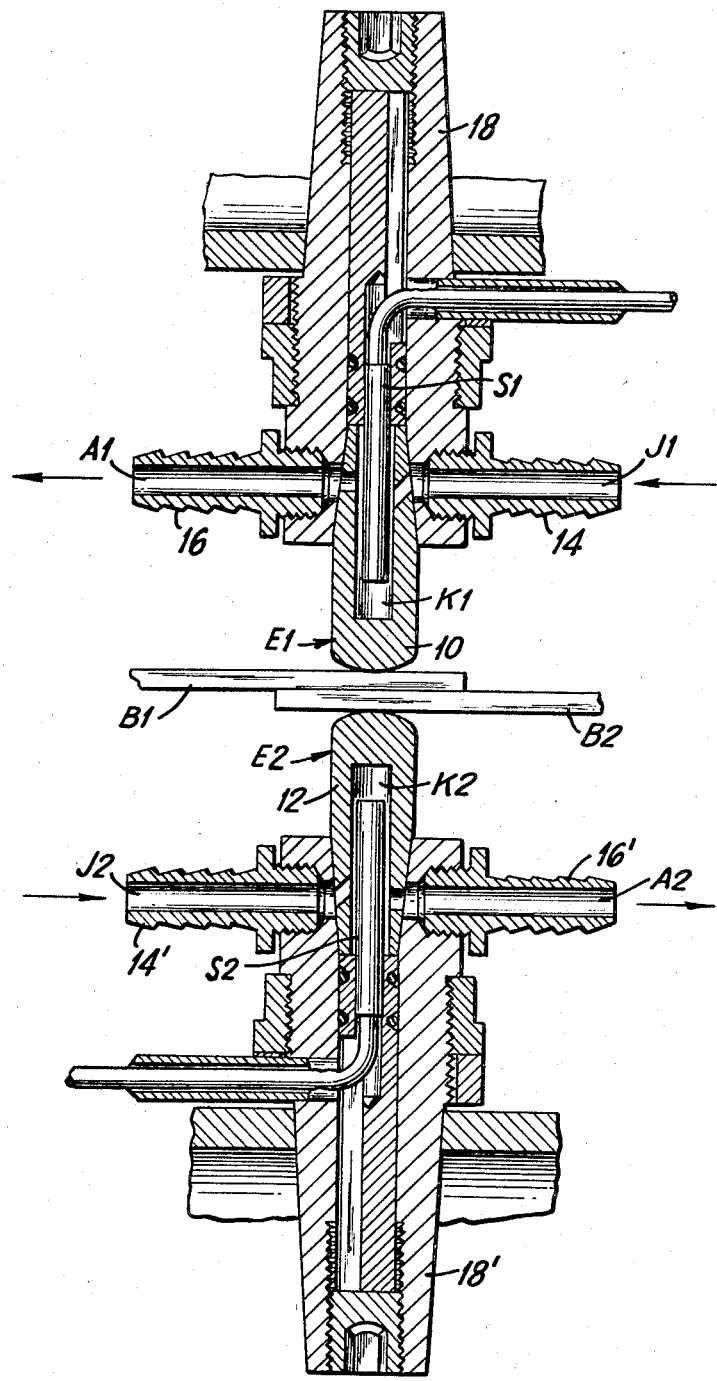
FIG. 2 is a sectional view illustrating the electrodes of the welding apparatus as designed in accordance with the invention.

Referring to FIG. 2, the mechanical part of the welding and testing apparatus comprises two electrodes generally designated E1 and E2, which are aligned, as indicated in FIG. 2, to weld plates B1 and B2 therebetween. The electrodes E1 and E2 correspond to the electrodes E1 of FIG. 1, and the plates B1 and B2 correspond to the plates P of FIG. 1. Electrodes E1 and E2 include cylindrical portions 10 and 12 which press against plates B1 and B2 with a predetermined pressure along the welding area. Each electrode's cylindrical portion 10 or 12 is formed with a hollow bore K1 or K2, respectively, through which coolant is circulated through inlet tubes 14 or 14′, respectively and discharged through outlet tubes 16 or 16′, respectively. The respective inlet and outlet tubes are connected into outer jackets 18 and 18′ of the electrodes E1 and E2, respectively.

Ultrasonic transducers S1 and S2 for the electrodes E1 and E2, respectively, are arranged within the respective cylindrical elements 10 and 12. These transducers S1 and S2 correspond, respectively, to the transducers S and E of FIG. 1. Transducers S1 and S2 are advantageously arranged in opposition along a common center line and along the common axis of the two electrodes.

Figure 3:
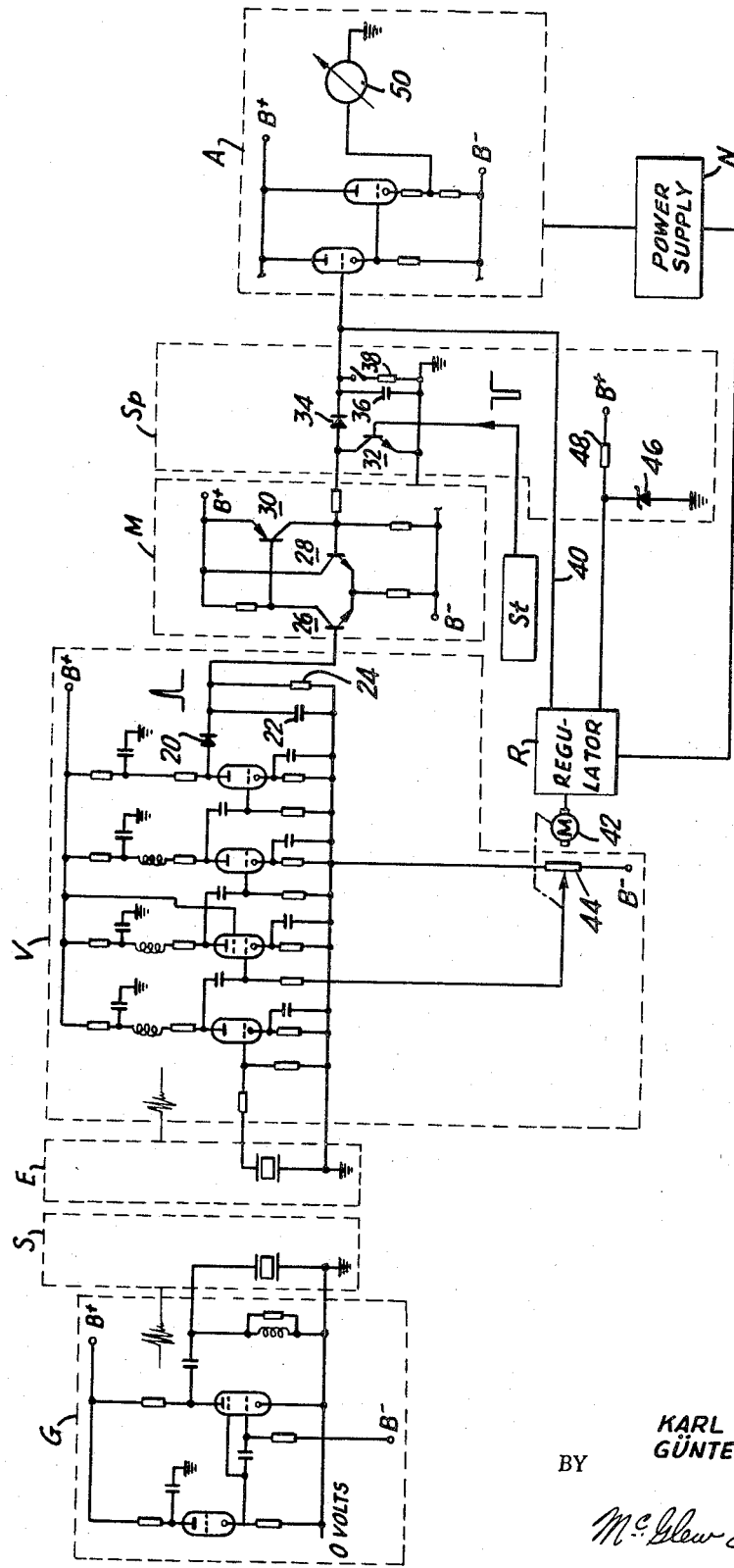
FIG. 3 is a schematic wiring diagram corresponding to the block diagram of FIG. 1.

FIG. 3 illustrates the internals of the apparatus shown in block form in FIG. 1. The majority of these internals are substantially conventional, and hence need not be described in detail. However, brief reference will be made to certain elements in order to illustrate adequately the interconnection and interrelation of the components.

Generator G is an essentially conventional high frequency oscillator provided with timing means and with pulse length or duration determining means. This generator applies the high frequency pulses to the sound transmitter S. The high frequency voltage from sound receiver E is coupled to the amplifier V which, as illustrated, is a multi-stage thermionic valve amplifier which rectifies and amplifies the output voltage of sound receiver E. The DC output voltage of amplifier V is applied through a diode 20 across a combination of a capacitor 22 and the resistor 24.

The output voltage of amplifier V is applied to the monitor M which is a transistorized unit including a pair of NPN transistors 26 and 28 connected in opposition, and a PNP transistor 30. Specifically, the output signal from amplifier V is applied to the base of transistor 26, and the base of transistor 28 is coupled to the collector of an NPN transistor 32 in storage unit S$p$. The base of transistor 32 receives a signal from the control unit S$t$. The output signal from monitor M is coupled through a diode 34 to a capacitor-resistor combination 36–38 where it is stored. This signal is also applied through a line 40 to the adjusting unit R. The adjusting unit R, through a motor 42, operates the adjustable contact of a potentiometer 44 which controls bias voltages of amplifier V.

Storage unit S$p$ further includes a Zener diode 46 in association with a resistor 48 to provide a fixed reference voltage for unit R. At the time of the second pulse series, which follows the welding current flow and while the workpieces are still clamped together, the difference between the input signal to monitor M and the signal stored in condenser 36 of storage means S$p$ is applied to the evaluating device A which includes, for example, an indicating meter 50. However, in a conventional manner, the signal actuating the indicating meter 50 may also be used as a control signal to adjust the parameters of the welding apparatus including the electrodes E1 and E2 of FIG. 2. Of course, such adjustment can also be effected manually in accordance with the indications of indicating instrument 50.

In the invention apparatus, the ultrasonic transducers and the electrodes are easily interchangeable, and their sizes can be adapted in an optimum manner to the testing conditions. Thus, if desired, a partial sonic treatment of the fused zone may be effected.

As mentioned, during cooling of the weld, gaps appear between the electrodes and the work piece surfaces due to shrinking of the weld. While the ultrasonic transducers have been illustrated as arranged for directing ultrasonic energy along the common axis of the two electrodes, for best results these ultrasonic transducers should be positioned or oriented in such a manner so as to transmit and receive the major portion of the ultrasonic energy through the zone of the mentioned gaps, and to transmit and receive only a minor portion of the ultrasonic energy through the remaining area of the weld. This is particularly true with respect to location or orientation of the sound receiving transducer to receive primarily the energy transmitted through the zone of the gaps, although such effect can be attained by suitable location or orientation of the sound transmitting transducer. Furthermore, in the mentioned instance, it is desirable to treat the zone of the weld where such gaps occur ultrasonically, while only partially ultrasonically treating the other areas of the weld zone.

For example, the sound receiving head can be made substantially smaller than the weld one, or the sound transmission channel or direction can be appropriately adjusted.

While a specific embodiment of the invention has been shown and described in detail to illustrate the application of the principles of the invention, it will be understood that the invention may be embodied otherwise without departing from such principles.

What is claimed is:

1. In an electric resistance pressure welding process including pressing juxtaposed workpieces between a pair of welding electrodes during a pre-pressure period prior to initiation of welding current flow between the electrodes, maintaining the pressure during flow of welding current between the electrodes, then interrupting the flow of welding current, and maintaining the pressure of the electrodes against the workpieces during an after-pressure period constituting a cooling period: a method for the non-destructive testing of the weld comprising the steps of transmitting ultrasonic energy through the electrodes and the workpieces during the pre-pressure period while the workpieces are mechanically pressed between the electrodes and in advance of initiation of welding current flow; measuring the then transmitted ultrasonic energy to obtain a first measured valve; interrupting the transmission of ultrasonic energy during the flow of welding current between the electrodes and through the workpieces; during the after-pressure period following interruption of the flow of welding current and while the pressure of electrodes against the workpieces is maintained during the cooling period, again transmitting ultrasonic energy through the electrodes and the welding zone and measuring the then transmitted ultrasonic energy to obtain a second measured value; and providing a quantitative comparison of said first and second measured values as an indication of the quality of the pressure weld.

2. In an electric resistance pressure welding process, a method for the non-destructive testing of the pressure weld, as claimed in claim 1, in which the step of obtaining such quantitative comparison of said first and second measured values comprises deriving the ratio of said first and second measured values as an indication of the quality of the pressure weld.

3. In an electric resistance pressure welding process, a method for the non-destructive testing of the pressure weld, as claimed in claim 1, comprising the step of adjusting the parameters of the electric resistance pressure welding process in accordance with such indication.

4. In an electric resistance pressure welding process, a method for the non-destructive testing of the pressure weld, as claimed in claim 3, in which the step of deriving a comparison of said first and second measured values comprises deriving the ratio of said first and second measured values.

5. In an electric resistance pressure welding process, a method for the non-destructive testing of the pressure weld, as claimed in claim 1, including the steps of storing said first measured value during flow of welding current between the electrodes; and releasing the stored first measured value concurrently with measurement of the second measured value to derive a third measured value by comparison of said first and second measured values and which is an indication of the quality of the pressure weld.

6. In an electric resistance pressure welding process, a method for the non-destructive testing of the pressure weld, as claimed in claim 5, including the step of utilizing said third measured value to adjust the parameters of the electric resistance pressure welding process.

7. In an electric resistance pressure welding process, a method for the non-destructive testing of the pressure weld, as claimed in claim 1, in which the ultrasonic energy transmitted during said pre-pressure period is transmitted as first pulses of ultrasonic energy; converting the then transmitted ultrasonic energy into a first measured electric value; the ultrasonic energy transmitted through said after-pressure and cooling period is transmitted as second pulses of ultrasonic energy; converting the latter transmitted ultrasonic energy pulses into a second measured electric value; and deriving a quantitative comparison of said first and second measured electric values as a third electric value which is an indication of the quality of the pressure weld.

8. In an electric resistance pressure welding process, a method for the non-destructive testing of the pressure weld, as claimed in claim 1, in which said ultrasonic energy is transmitted as pulses of ultrasonic energy, of relatively short duration.

9. In an electric resistance pressure welding process, a method for the non-destructive testing of the pressure weld, as claimed in claim 1, in which the major portion of the transmitted ultrasonic energy is concentrated in that area of the welding zone in which gaps may occur between the electrodes and the surfaces of the workpieces due to shrinking of the workpieces during the cooling thereof.

10. In an electric resistance pressure welding process, a method for the non-destructive testing of the pressure weld, as claimed in claim 9, in which the ultrasonic energy transmitted during said pre-pressure period is transmitted as a first series of short duration pulses of ultrasonic energy with the transmitted ultrasonic energy pulses being converted into a first measured electric value; the ultrasonic energy transmitted during said after-pressure and cooling period being transmitted as a second series of short duration pulses of ultrasonic energy with the then transmitted ultrasonic energy pulses being converted into a second measured electric value; said first and second measured electric values being quantitatively compared to obtain a third electric value which is an indication of the quality of the pressure weld.

11. In an electric resistance pressure welding process, a method for the non-destructive testing of the pressure weld, as claimed in claim 10, including the steps of storing said first measured electric value during flow of the welding current between the electrodes; and releasing the stored first measured electric value during duration of the second measured electric value for combining of the two values to obtain the third measured electric value.

12. In electric resistance pressure welding in which, during a pre-pressure period prior to the flow of welding current, the workpieces are pressed together under pressure between a pair of welding electrodes and, after formation of an electric resistance pressure weld by flow of welding current between the electrodes and through the workpieces, the welding current is interrupted and the workpieces are maintained under pressure between the electrodes during and after-pressure and cooling period: apparatus for the non-destructive testing of the pressure welds comprising, in combination, first and second welding electrodes arranged for electrical connection to opposite terminals of the source of welding current and each having a work-engaging tip formed with a bore for circulation of coolant in heat-exchange relation with said tip; said electrodes being arranged in opposition to each other to press workpieces between their tips during said pre-pressure period, during formation of a pressure weld by flow of welding current between said tips and through said workpieces, and during said after-pressure and cooling period; coolant circulating means connected to said tips for circulating liquid coolant through said tips; a first ultrasonic transducer arranged in the coolant in the bore of the tip of said first welding electrode; a second ultrasonic transducer arranged in the coolant in the bore of the tip of said second welding electrode; one of said transducers being operable to transmit ultrasonic energy through its ambient coolant, through the tips of said electrodes and through the workpieces, and the other of said transducers being arranged to receive ultrasonic energy transmitted through said electrodes and the workpieces and through its ambient coolant; means energizing said one transducer to transmit ultrasonic energy during only said pre-pressure period, in which the workpieces are clamped between said electrode tips prior to flow of welding current, and said after-pressure and cooling period, during which said workpieces are clamped between said electrodes after interruption of the welding current flow; measuring means connected to said other transducer and measuring the ultrasonic energy transmitted through said electrodes and the workpieces during each of said two periods to obtain two respective measured values; and comparing means comparing quantitatively the two measured values to provide an indication of the quality of the pressure weld.

13. In electric resistance pressure welding, apparatus for the non-destructive testing of the pressure welds, as claimed in claim 12, in which said measuring means includes means converting the transmitted ultrasonic energy into two respective corresponding electric values.

14. In electric resistance pressure welding, apparatus for the non-destructive testing of the pressure welds, as claimed in claim 13, in which said measuring means includes means storing the measured electric value of the ultrasonic energy transmitted during said pre-pressure period and releasing such stored value, during said after-pressure and cooling period, for comparison with the measured electric value of the ultrasonic energy transmitted during said after-pressure and cooling period.

15. In electric resistance pressure welding, apparatus for the non-destructive testing of the pressure welds, as claimed in claim 14, in which said comparison means derives the ratio of said two measured electric values.

16. In electric resistance pressure welding, apparatus for the non-destructive testing of the pressure welds, as claimed in claim 12, including means operable, in response to said indication, to adjust the parameters of the electric resistance pressure welding operation.

17. In electric resistance pressure welding, in which said means energizing said one transducer energizes the latter to transmit ultrasonic energy in a series of pulses.

18. In electric resistance pressure welding, apparatus for the non-destructive testing of the pressure welds, as claimed in claim 17, in which said ultrasonic energy is transmitted in short pulses.

References Cited

UNITED STATES PATENTS

| 2,433,963 | 1/1948 | Tarbox et al. | 219—109 |
| 2,846,563 | 8/1958 | Cronin | 219—128 X |
| 2,848,595 | 8/1958 | Von Sciver | 219—110 X |
| 3,068,350 | 12/1962 | Archer | 219—110 |
| 3,149,221 | 9/1964 | Watter et al. | 219—110 |

RICHARD M. WOOD, *Primary Examiner.*

J. G. SMITH, *Assistant Examiner.*